US 9,798,786 B2

(12) United States Patent
Bernhardt et al.

(10) Patent No.: US 9,798,786 B2
(45) Date of Patent: Oct. 24, 2017

(54) POPULATION AND/OR ANIMATION OF SPATIAL VISUALIZATION(S)

(71) Applicant: Microsoft Technology Licensing, LLC, Redmond, WA (US)

(72) Inventors: Daniel Bernhardt, London (GB); Michael Kaisser, Berlin (DE); Antonino Gulli, Pisa (IT)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/672,712

(22) Filed: Mar. 30, 2015

(65) Prior Publication Data

US 2015/0205843 A1    Jul. 23, 2015

Related U.S. Application Data

(63) Continuation of application No. 13/355,874, filed on Jan. 23, 2012, now Pat. No. 9,009,159.

(51) Int. Cl.
*G06F 17/30* (2006.01)

(52) U.S. Cl.
CPC .. *G06F 17/30554* (2013.01); *G06F 17/30601* (2013.01); *G06F 17/30864* (2013.01); *G06F 17/30867* (2013.01); *G06F 17/30991* (2013.01); *G06F 17/30598* (2013.01)

(58) Field of Classification Search
CPC ......... G06F 17/30598; G06F 17/30864; G06F 17/30991; G06F 17/30554; G06F 17/30601; G06F 17/30867
USPC .......................... 707/738, 754, 737; 345/419
See application file for complete search history.

(56) References Cited

U.S. PATENT DOCUMENTS

| 7,447,509 | B2 | 11/2008 | Cossins et al. | |
| 7,609,257 | B2 | 10/2009 | Wright et al. | |
| 7,958,457 | B1* | 6/2011 | Brandenberg | G01S 19/48 715/789 |

(Continued)

OTHER PUBLICATIONS

Mackaness, et al.., "Use of Graph Theory to Support Generalization," Retrieved at <<http://www.geos.ed.ac.uk/homes/wam/MackBeard1993.pdf>>, Cartography and Geographic Information Systems, vol. 20, Published: 1993, pp. 210-221.

(Continued)

*Primary Examiner* — Shahid Alam

(57) ABSTRACT

One or more techniques and/or systems are provided for populating and/or animating a spatial visualization, such as a map, a timeline, and/or other 2D and/or 3D visual representations of locations. The spatial visualization may be populated with events extracted from a data source (e.g., real-time events, news events, social network events, etc.), and may include relationships between events (e.g., based upon time, location, contextual similarity (e.g., social network check-in events at a restaurant), events referencing one another (e.g., an article describing a first event may comprise a hyperlink to an article describing a second event) etc.). Filter criteria (e.g., date, event type, location, etc.) may be applied to events and/or relationships when populating the spatial visualization. A sequence of events and corresponding relationships may be animated within the spatial visualization (e.g., as the events unfold over a (user) designated period of time).

20 Claims, 12 Drawing Sheets

(56) References Cited

U.S. PATENT DOCUMENTS

| | | | | |
|---|---|---|---|---|
| 8,700,612 | B2* | 4/2014 | Schwob | G06F 17/30014 707/722 |
| 8,917,274 | B2* | 12/2014 | Ma | G06T 11/206 345/440 |
| 9,009,159 | B2 | 4/2015 | Bernhardt et al. | |
| 2009/0228474 | A1 | 9/2009 | Chiu et al. | |
| 2010/0185609 | A1* | 7/2010 | Wright | G06T 11/206 707/724 |
| 2010/0332468 | A1* | 12/2010 | Cantrell | G06F 17/30241 707/724 |

OTHER PUBLICATIONS

Deligiannidis, et al., "Event Visualization in a 3D Environment," Retrieved at <<http://ieeexplore.ieee.org/stamp/stamp.jsp?tp+&arnumber+4581426>>, Conference on Human System Interaction, Published: May 25-27, 2008, pp. 158-164.

Kapler, et al., "GeoTime Information Visualization," Retrieved at http://vadl.cc.gatech.edu/documents/55_Wright_KaplerWright_GeoTime_InfoViz_Jrnl_05_send.pdf>>, Information Visualization Journal, vol. 4, Issue 2, Published: 2005, pp. 11.

Chung, et al., "Evaluating Event Visualization: A Usability Study of COPLINK Spatio-Temporal Visualizer," Retrieved at <<http://ai.arizona.edu/intranet/papers/Evaluating%20Event%20Visualization%20A%20Usability%20Study%20of%20COPLINK%20Spatio-Temporal%20Visualizer.pdf>>, International Journal of Human-Computer Studies, vol. 62, Issue 1, Published: 2005, pp. 127-157.

U.S. Appl. No. 13/355,874, Notice of Allowance mailed Dec. 8, 2014, 8 pages.

U.S. Appl. No. 13/355,874, Notice of Allowance mailed Dec. 11, 2014, 12 pages.

U.S. Appl. No. 13/355,874, Amendment and Response filed Nov. 13, 2014, 13 pages.

U.S. Appl. 13/355,874, Non-Final Rejection mailed Aug. 13, 2014, 10 pages.

\* cited by examiner

POPULATION AND/OR ANIMATION OF SPATIAL VISUALIZATION(S)

RELATED APPLICATION

This application is a continuation of and claims priority to U.S. application Ser. No. 13/355,874, filed on Jan. 23, 2012, titled "POPULATION AND/OR ANIMATION OF SPATIAL VISUALIZATION(S)," now issued as U.S. Pat. No. 9,009,159, at least some of which may be incorporated herein.

BACKGROUND

Today, users are able to create, organize, share, and/or interact with a wide variety of digital information or content. In one example, a user may interact with travel directions provided by a mapping application on a cell phone. In another example, a user may be able to create a social network profile that may be shared with friends through a social network service. To aid users in locating desired content, search engines may provide organized content to users in response to user search queries (e.g., a photo sharing search engine, a web page search engine, a file system search engine, etc.). Such content may be organized into textual and/or visual lists. Unfortunately, displaying content within such content organization structures may not provide a dynamic view of the content over time. Conventional content organizational structures may not illustrate relationships between content, how content has evolved over time, and/or spatial information of such content. Accordingly, the user may be left to sift through a vast amount of unorganized content to locate desired content while other information may be unavailable to users in a digestible form using current conventional methods.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for populating and/or animating a spatial visualization are disclosed herein. It may be appreciated that a spatial visualization may comprise any one or more of a variety of location-based visualizations, such as maps, 3D maps, graphs, timelines, etc. The spatial visualization may be populated with events and/or relationships between events. An event may comprise data associated with a location and/or an event time (e.g., a single date/time, a date/time range, a point in time, time span, time frame, etc.). For example, events may comprise historical events (e.g., births, deaths, natural disasters, battles, etc.), news stories, sports events (e.g., tackles, shots, penalties, and/or other key moments within a soccer game), personal events (e.g., taking a photo, making a phone call, social network "checking in" at a particular location, performing a web search, etc.), real-time events (e.g., social network "check-ins", web searches, localized micro-blogging messages, etc.), and/or a plethora of other types of events.

In one example of populating the spatial visualization, a set of events may be extracted from a data source (e.g., a social network service, a website, a mapping service, a GPS device, an online article database, an online encyclopedia database, a real-time stream of data, etc.). Event types may be assigned to events based upon various factors. In one example, an event type field defined by or within the data source may be evaluated to identify the event type (e.g., a social network service may explicitly define an event as a social network check-in event type). In another example, a classification technique may be executed upon data from the data source to identify the event type (e.g., a text classification technique may be executed upon an article of an online encyclopedia website to determine that the article describes a natural disaster type of event). In this way, an event may comprise an event type. The event may comprise a location, which may be explicitly identified (e.g., GPS location, latitude/longitude information, etc.) and/or implicitly identified (e.g., implied based upon address lines, location names, etc.). The event may comprise an event date, which may be explicitly identified and/or implicitly identified (e.g., identified from a textual date description).

A set of relationships associated with the set of events may be created. A relationship may be defined by a first event, a second event, a relationship time (e.g., a point in time, time span, time frame, etc.), and/or a relationship type. The relationship may describe an association between the first event and the second event (e.g., a directed relationship and/or an undirected relationship). In one example, the relationship may be based upon a temporal relationship. The temporal relationship may be identified based upon a first event time of the first event corresponding to a second event time of the second event (e.g., a first shot on goal event may be temporally associated with a second shot on goal event based upon the shots on goal occurring within a few seconds of one another during a soccer game). In another example, the relationship may be based upon a spatial relationship. The spatial relationship may be identified based upon a first location of the first event corresponding to a second location of the second event (e.g., a first friend check-in event at a movie theater may be spatially associated with a second friend check-in event at the movie theater, which may indicate that the first friend and second friend may be viewing a movie together). In another example, the relationship may be based upon a referential relationship. The referential relationship may be identified based upon data associated with the first event comprising a reference to data associated with the second event (e.g., a first article describing the first event may comprise a reference to a second article describing the second event). In another example, the relationship may be based upon a contextual relationship. The contextual relationship may be identified based upon a first event type of the first event corresponding to a second event type of the second event (e.g., a first shot on goal event may be contextually related to a second shot on goal event because both events may comprise an event type of blue team shot on goal event type).

The spatial visualization may be populated using one or more events from the set of events and/or using one or more relationships from the set of relationships. For example, the spatial visualization may comprise a soccer field map. A user may specify filter criteria that penalty events and penalty shot events by a blue team during a first half of a soccer game are to be populated within the soccer field map. In this way, blue team penalty events and/or blue team penalty shot events within the set of events may be populated within the spatial visualization (e.g., blue team penalty events may be illustrated by blue star symbols and blue team penalty shot events may be illustrated as blue soccer ball symbols within the soccer field map). Relationships between such events may be populated within the spatial visualization. For example, a directed relationship comprising a blue team penalty shot event having a directed relationship to a blue team penalty event may be illustrated as an arrowed edge from the blue team penalty event to the blue team penalty shot event. The spatial visualization may be repopulated based upon subsequent filter criteria (e.g., the user may specify that shots on goal by the blue team during a second half of the soccer game are to be populated within the soccer field map). In this way, a user may interactively visualize events and/or relationships between events within the spatial visualization. For example, the user may specify a desired time frame using any kind of interface such as text boxes, drop down boxes, time sliders etc.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
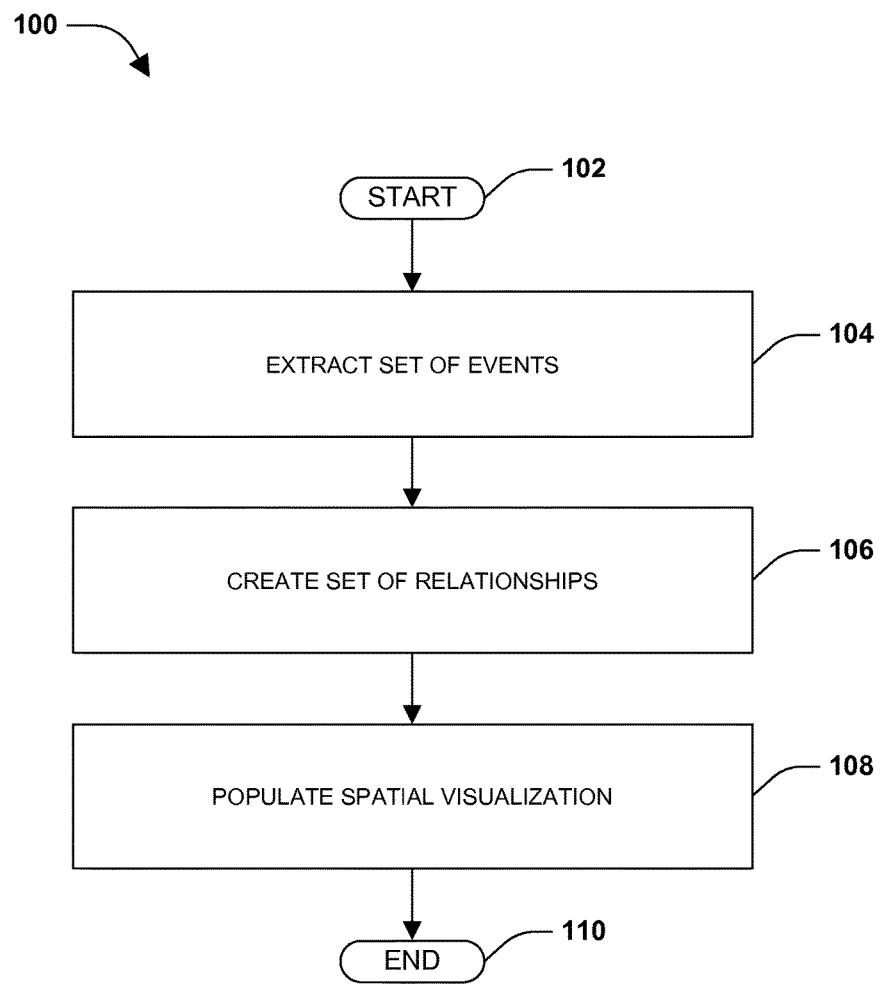
FIG. 1 is a flow chart illustrating an exemplary method of populating a spatial visualization.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Events, such as historic events, social network events, sporting game events, etc., may be identifiable and/or described by data sources (e.g., a social network service, an article database, an image database, etc.). Unfortunately, a data source may not adequately organize and/or present such events to a user, which may leave the user to sift through thousands of unorganized events and potentially miss desirable information inherently available in the data source but not made available through conventional methods. Additionally, the data source may not identify and/or describe relationships between events for the user. For example, a web search engine may merely return a list of relevant websites associated with a search query submitted by a user, but may not identify relationships between events described within such websites.

Accordingly, among other things, one or more systems and/or techniques for populating a spatial visualization are provided herein. In particular, a spatial visualization, such as a map, may be populated with events and/or relationships between events. In one example, the spatial visualization may be presented as an interactive user interface, where events may be illustrated as symbols, undirected relationships may be illustrated as edges between events, and directed relationships may be illustrated as arrowed edges between events, for example. It may be appreciated that other illustrations of events, undirected relationships, and/or directed relationships are contemplated herein (e.g., textual illustrations, visual illustrations, audio illustrations, and/or video illustrations may be used). The spatial visualization may be dynamically repopulated based upon occurrences of new real-time events and/or may be dynamically repopulated based upon filter criteria (e.g., a date filter, a location filter, an event type filter, a user preference filter, etc.). For example, a user may utilize a time slider to specify a time range of events to display within the spatial visualization. It may be appreciated that the time range may vary from a single point in time to a time period (e.g., a time period within a few minutes, a time period within a day, a time period spanning a few days, a time period spanning years, etc.). In another example, the spatial visualization may be animated over a time frame (e.g., through a time slider and/or text input). For example, events and/or relationships may "unfold" over time from a starting time of the time frame to an ending time of the time frame (e.g., the time slider may move at a fixed speed of 1 year/second for an animation of historic events over a 30 year time frame, such that events and/or relationships corresponding to a current time of the time slider (e.g., as the slider moves at the fixed speed (e.g., for 30 seconds)) may be illustrated within the spatial visualization).

One embodiment of populating a spatial visualization is illustrated by an exemplary method 100 in FIG. 1. At 102, the method starts. At 104, a set of events may be extracted from a data source. In one example, events may be extracted from various web sources, such as a web article database. In another example, events may be extracted in real-time as they become available from the data source, such as a real-time stream of social network updates. The events may comprise a location and/or an event time (e.g., a penalty shot event of a soccer game may comprise a location within a soccer field and/or a time at which the penalty shot event occurred). Event types may be assigned to events within the set of events. In one example, an event type field defined by the data source may be evaluated to identify the event type (e.g., a social network data source may specify that a friend check-in event is of a check-in event type). In another example, a classification technique may be executed upon data from the data source to identify the event type (e.g., a text-based classification technique may be executed upon an article to determine that the article describes a historic battle, which may be assigned a battle event type). In this way, an event may comprise a location, an event time, and/or an event type, for example.

At 106, a set of relationships associated with the set of events may be created. A relationship may comprise a first event, a second event, a relationship time (e.g., a point in time, time span, time frame, etc.), and/or a relationship type. In one example, the relationship may comprise a directed relationship from the first event to the second event (e.g., a penalty kick event may have a directed relationship to a penalty event because the penalty kick event resulted from the occurrence of the penalty event). In another example, the relationship may comprise an undirected relationship between a first event and a second event (e.g., a first party invitation acceptance event associated with Dan and a second party invitation acceptance event associated with Colleen to the same party may have an undirected relationship). The relationship time may be defined based upon a first event time of the first event and a second event time of the second event. It may be appreciated, however, that as provided herein the relationship may be defined in any other way which describes a time, time span, time frame, etc. during which a relationship exists between the two events. The relationship type may be defined based upon a first event type of the first event and a second event type of the second event. It may be appreciated, however, that the relationship may additionally or alternatively be derived from other event properties (e.g., such as time and/or location) and/or derived through other manner(s). In this way, a relationship may comprise a first event, a second event, a relationship time, and/or a relationship type.

In one example of creating a relationship, the relationship may be based upon a temporal relationship identified based upon a first event time of the first event and a second event time of the second event. For example, a temporal relationship may be identified based upon a first check-in event at a movie theater by Dan with a 9:00 pm event time and a second check-in event at the movie theater by Colleen with a 9:01 pm event time (e.g., Dan and Colleen attended the movie together). In another example of creating a relationship, the relationship may be based upon a spatial relationship identified based upon a first location of the first event corresponding to a second location of the second event (e.g., a spatial relationship may be identified based upon a first Japan earthquake article describing a rescue event in Sendai and a second Japan earthquake article describing a survivor story event in Sendai). In one example, temporal relationships and/or spatial relationships may be based upon threshold time spans and/or threshold distances.

In another example of creating a relationship, the relationship may be based upon a referential relationship identified based upon data associated with the first event comprising a reference to data associated with the second event (e.g., a referential relationship may be identified based upon a first article describing a rescue event comprising a reference, such as a hyperlink, to a second article describing a survivor story event). In another example of creating a relationship between first and second events, the relationship may be based upon a contextual relationship identified based upon a first event type of the first event corresponding to a second event type of the second event (e.g., a contextual relationship may be identified based upon a blue team penalty shot event type of a first penalty shot event corresponding to a blue team penalty shot event type of a second penalty shot event). It may be appreciated that a relationship may be based upon a variety of other types of relationships and/or may be based upon a combination of one or more types of relationships.

At 108, a spatial visualization may be populated using one or more events from the set of events and/or one or more relationships from the set of relationships. The spatial visualization may comprise a variety of visualizations, such as a map, a timeline, and/or a visual representation of a physical location, for example. Events may be represented as symbols within the spatial visualization (e.g., a restaurant check-in event may be represented by a food symbol, while a movie check-in event may be represented by a movie reel symbol). A symbol of an event may be sized according to an importance ranking, which may be determined based upon evaluating data associated with the event from the data source. For example, a symbol representing a first soccer shot event resulting in a final game winning goal may be sized larger than a symbol representing a second soccer shot event resulting in a goalie save (e.g., a high importance ranking may be assigned to the first soccer shot event based upon evaluating an article describing the game winning shot of the soccer game).

Figure 2:
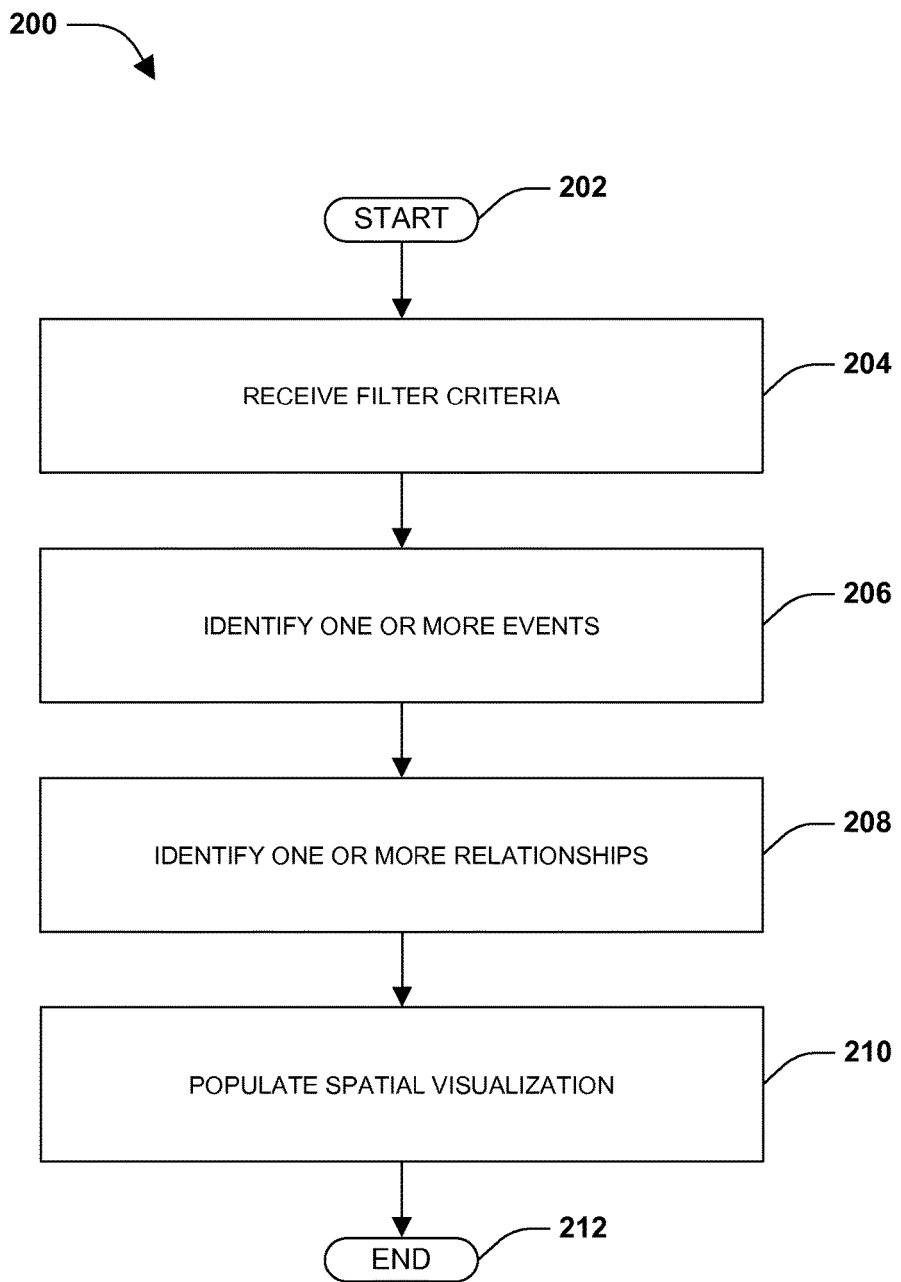
FIG. 2 is a flow chart illustrating an exemplary method of populating a spatial visualization.

The spatial visualization may be populated based upon filter criteria (e.g., a date filter, a location filter, an event type filter, a user preference filter, etc.). For example, the filter criteria may be applied to the set of events to create a filtered set of events (e.g., a soccer shot event type filter may be used create a filtered set of soccer shot events out of some or all events recorded in a soccer game). The filter criteria may be applied to the set of relationships to create a filtered set of relationships (e.g., a penalty resulting in penalty kick filter may be used to create a filtered set of directed relationships of penalty kick events having directed relationships to penalty events). In this way, the spatial visualization may be populated and/or repopulated based upon the filter criteria. The spatial visualization may be presented as an interactive user interface (e.g., a user may visually explore dynamic events and/or relationships that may be populated and/or repopulated within the spatial visualization based upon user input, such as filter criteria specified by the user, and/or based upon occurrences of new real-time events). Events may be illustrated as symbols, undirected relationships may be illustrated as edges between events, and/or directed relationships may be illustrated as arrowed edges between events, for example. In one example, a first spatial visualization (e.g., check-in events occurring in April) may be linked to a second spatial visualization (e.g., check-in events occurring in May), which may provide a user friendly interface for a user to explore events across various spatial visualizations. At 110, the method ends One embodiment of populating a spatial visualization is illustrated by an exemplary method 200 in FIG. 2. At 202, the method starts. It may be appreciated that in one example, a set of events may have been extracted from a data source, and that a set of relationships associated with the set of events may have been created. At 204, filter criteria (e.g., a date filter, a location filter, an event type filter, a user preference filter, etc.) may be received. In one example, a user may have set a user preference filter that social network check-in events from a particular set of friends are to be displayed within the spatial visualization. In another example, a user may have slid a time slider to a particular date/time range, which may be received as a date filter. In another example, GPS coordinates of a cell phone may be received as a location filter. It may be appreciated that in one example, a user of the cell phone may consent (e.g., turn on an option) for GPS coordinates of the cell phone to be utilized. In another example, a user may have selected a penalty kick event type within an event type dropdown box, which may be received as an event type filter.

At 206, one or more events from the set of events may be identified based upon the filter criteria (e.g., penalty kick events and penalty events of a soccer game may be identified based upon a penalty kick event type filter and a penalty event type filter). At 208, one or more relationships associated with the one or more events may be identified (e.g., directed relationships between penalty kick events to penalty events may be identified). At 210, the spatial visualization may be populated using the one or more events and/or the one or more relationships (e.g., an interactive soccer field map may be populated). In one example, the spatial visualization may be animated over a time frame (e.g., if a time frame of 45 minutes is specified, then each minute of the soccer game may be represented as a second of animation, and thus an animation time slider may move at one minute/second during a 45 second animation). At 212, the method ends.

Figure 3:
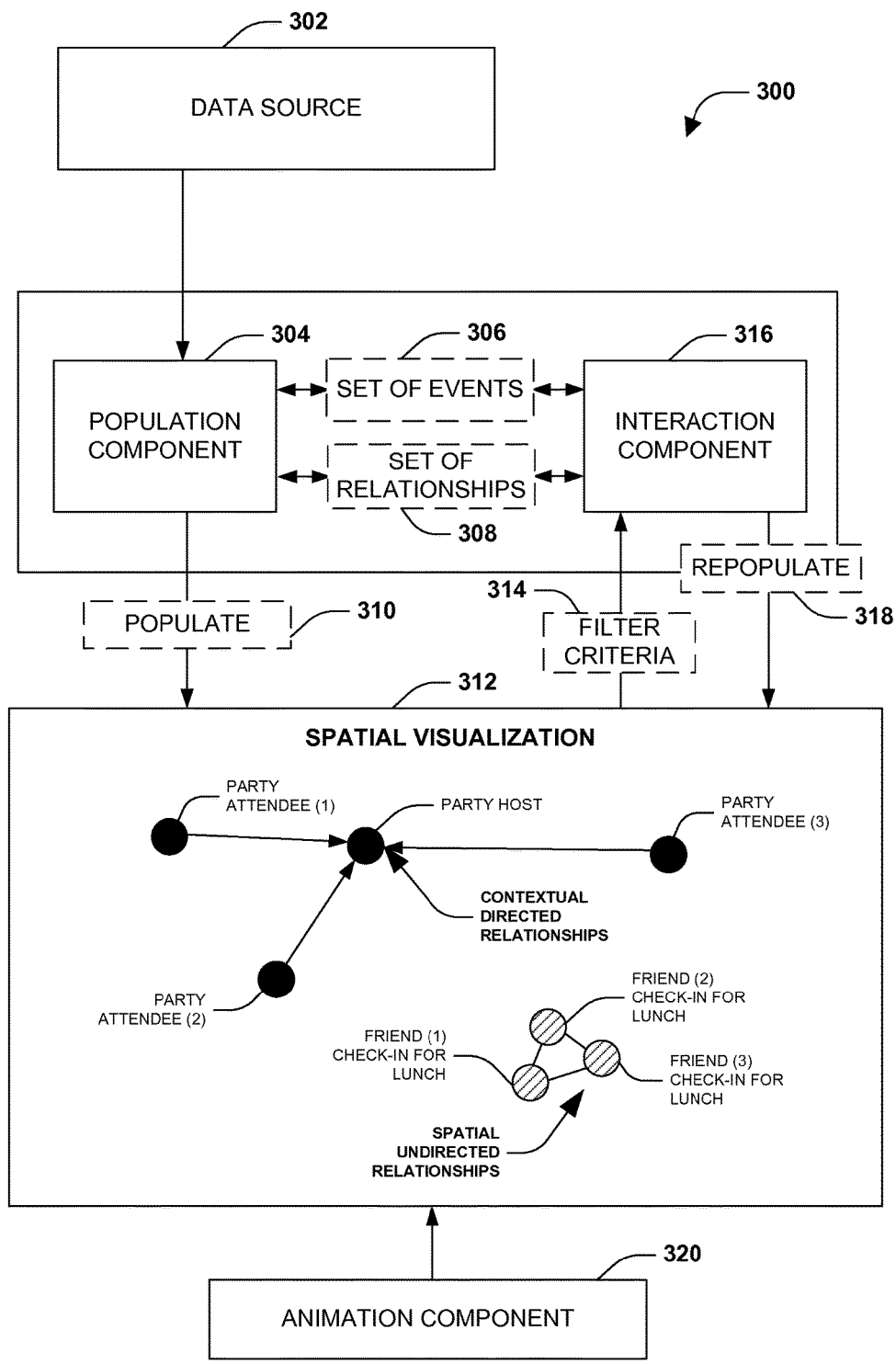
FIG. 3 is a component block diagram illustrating an exemplary system for populating a spatial visualization.

FIG. 3 illustrates an example of a system 300 configured for populating a spatial visualization 312. The system 300 may comprise a population component 304, an animation component 320, and/or an interaction component 316. The population component 304 may be configured to extract a set of events 306 from a data source 302. An event may comprise a location, an event time, and/or an event type (e.g., an event type predefined by the data source 302 and/or an event type identified using a classification technique, such as a text classification technique). The population component 304 may be configured to create a set of relationships 308 associated with the set of events 306. A relationship may comprise a first event, a second event, a relationship time, and/or a relationship type (e.g., a directed relationship and/or an undirected relationship between the first event and the second event occurring at the relationship time). A relationship may be based upon a temporal relationship (e.g., the first and second events occurring at similar time periods), a spatial relationship (e.g., the first and second events occurring in similar locations), a referential relationship (e.g., data associated with the first event referencing data associated with the second event), a contextual relationship (e.g., the first and second events may be similar types of events) and/or any other kind of relationship that relates two events to one another (e.g., as may be provided for by mathematical set theory).

The population component 304 may be configured to populate 310 the spatial visualization 312 using one or more events from the set of events 306 and/or one or more relationships from the set of relationships 308. In one example, the population component 304 may be configured to receive filter criteria (e.g., a date filter, a location filter, an event type filter, a user preference filter, etc.). The population component 304 may apply the filter criteria to the set of events 306 and/or the set of relationships 308 to determine the one or more events and/or the one or more relationships with which to populate 310 the spatial visualization 312. For example, a user may specify an interest in party events and restaurant check-in events of friends from a social network. The spatial visualization 312 may be populated 310 with a party invitation event of a party host, a party acceptance event of a party attendee (1), a party acceptance event of a party attendee (2), and/or a party acceptance event of a party attendee (3), which may be illustrated as black circle symbols. The spatial visualization 312 may be populated 310 with contextually-based directed relationships from the party acceptance events to the party invitation event because such events may relate to a party (e.g., and thus are contextually-based) and are directed because the acceptance events may have occurred in response to the party invitation event). The spatial visualization 312 may be populated 310 with a restaurant check-in event of friend (1), a restaurant check-in event of friend (2), and/or a restaurant check-in event of friend (3), which may be illustrated as transparent circle symbols with slanted lines or hash marks. The spatial visualization 312 may be populated 310 with spatially-based undirected relationships between the restaurant check-in events because the restaurant check-in events may have occurred within a threshold distance and/or time of one another, but not necessarily in response to a particular event (e.g., the party invitation event), and thus may be treated as undirected relationships.

The interaction component 316 may be configured to receive filter criteria 314 (e.g., a date filter, a location filter, an event type filter, a user preference filter, etc.). The interaction component 316 may be configured to create a filtered set of events and/or a filtered set of relationships based upon the filter criteria 314. In this way, the interaction component 316 may be configured to repopulate 318 the spatial visualization 312 based upon the filtered set of events and/or the filtered set of relationships.

The animation component 320 may be configured to animate the spatial visualization 312 over a time frame (e.g., illustrate events and/or relationships as they occur or unfold during the time frame). For example, a 10 hour time frame may be set for the spatial visualization 312, such that events and/or relationships may be illustrated within the spatial visualization 312 as they occur during the 10 hour time frame. For example, 20 minute portions of the 10 hour time frame may be represented as 1 second animation time frames (e.g., an animation time slider may move at 20 minutes/second during a 30 second animation of a 10 hour period of time). For example, events and/or relationships occurring within a first 20 minutes may be illustrated within the spatial visualization 312 during a first 1 second animation time frame, events and/or relationships occurring within a second 20 minutes may be illustrated within the spatial visualization 312 during a second 1 second animation time frame, etc. In this way, events and/or relationships may be animated within the spatial visualization 312 as they "unfold" over time.

Figure 4:
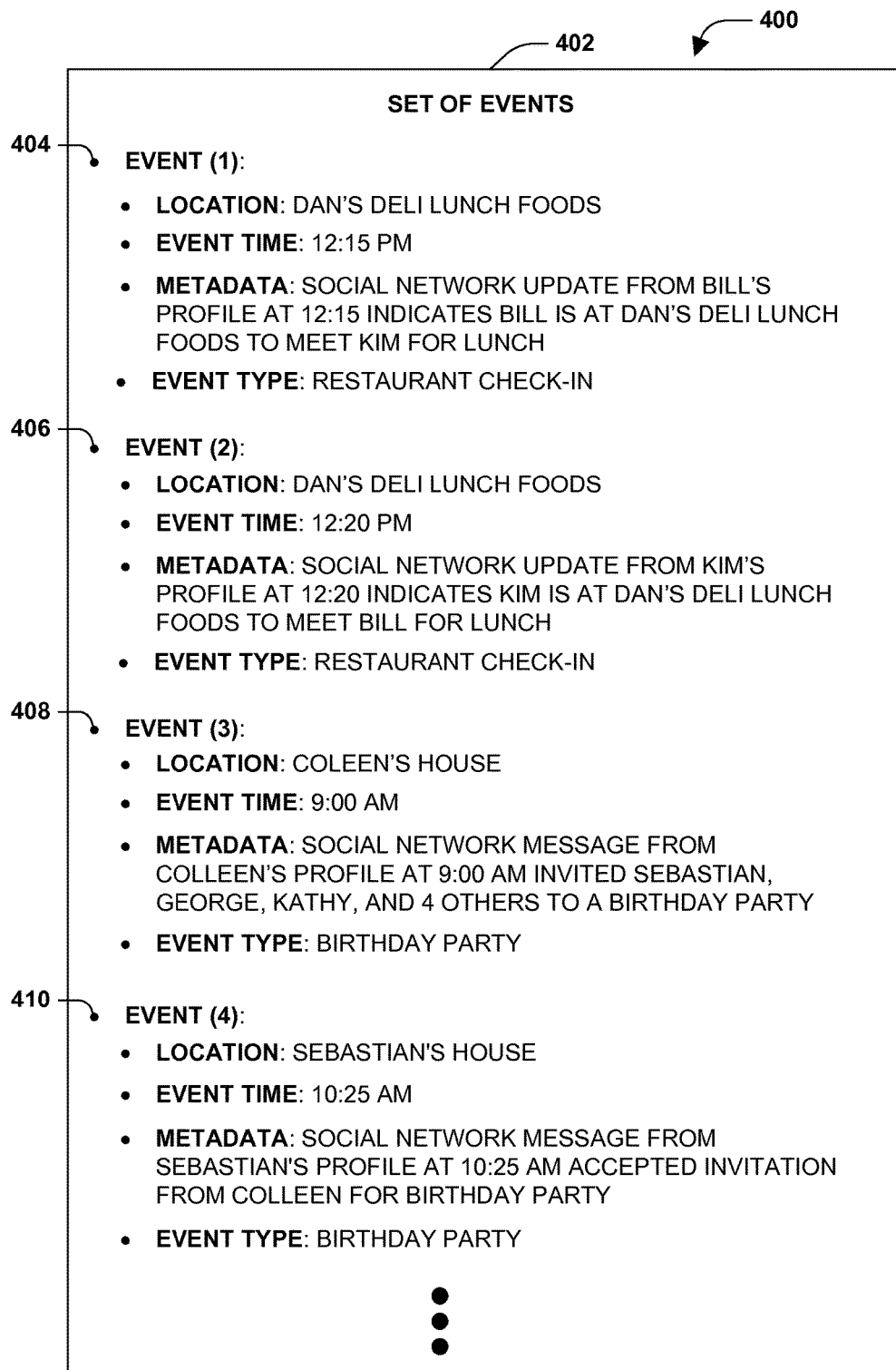
FIG. 4 is an illustration of an example of a set of events.

FIG. 4 illustrates an example 400 of a set of events 402. The set of events 402 may comprise an event (1) 404, an event (2) 406, an event (3) 408, an event (4) 410, and/or other non-illustrated events extracted from a data source, such as a social network. In one example, event (1) 404 may be associated with metadata describing event (1) 404 as being based upon a social network update from Bill's profile at 12:15 pm, which may indicate that Bill is at Dan's Deli Lunch Foods to meet Kim for Lunch. Event (1) 404 may comprise a location of Dan' Deli Lunch Foods, an event time of 12:15 pm, and/or an event type of restaurant check-in (e.g., the social network may have specified that event (1) 404 is of a check-in event type, which may be further identified as a restaurant check-in type based upon performing a web search query and/or a classification technique to determine that Dan's Deli Lunch Foods is a restaurant).

Event (2) 406 may be associated with metadata describing event (2) 406 as being based upon a social network update from Kim's profile at 12:20 pm indicating that Kim is at Dan's Deli Lunch Foods to meet Bill for lunch. Event (2)

406 may comprise a location of Dan' Deli Lunch Foods, an event time of 12:20 pm, and/or an event type of restaurant check-in (e.g., the social network may have specified that event (2) 406 is of a check-in event type, which may be further identified as a restaurant check-in type based upon performing a web search query and/or a classification technique to determine that Dan's Deli Lunch Foods is a restaurant).

Event (3) 408 may be associated with metadata describing event (3) 408 as being based upon a social network message from Colleen's profile at 9:00 am, which invited Sebastian, George, Kathy, and four others to a birthday party. Event (3) 408 may comprise a location of Colleen's house, an event time of 9:00 am (e.g., when the social network message was sent), and an event type of birthday party (e.g., the birthday party event type may have been identified based upon a text-based classification technique executed upon the social network message and/or from an event type that was chosen by Colleen explicitly and stored with the message event).

Event (4) 410 may be associated with metadata describing event (4) 410 as being based upon a social network message from Sebastian's profile at 10:25 AM, which accepted the invitation from Colleen for the birthday party. Event (4) may comprise a location of Sebastian's house (e.g., where the social network message was created), an event time of 10:25 am (e.g., when the social network message was sent), and an event type of birthday party (e.g., the birthday party event type may have been identified based upon a text-based classification technique executed upon the social network message and/or from an event type associated with the acceptance message event).

Figure 5:
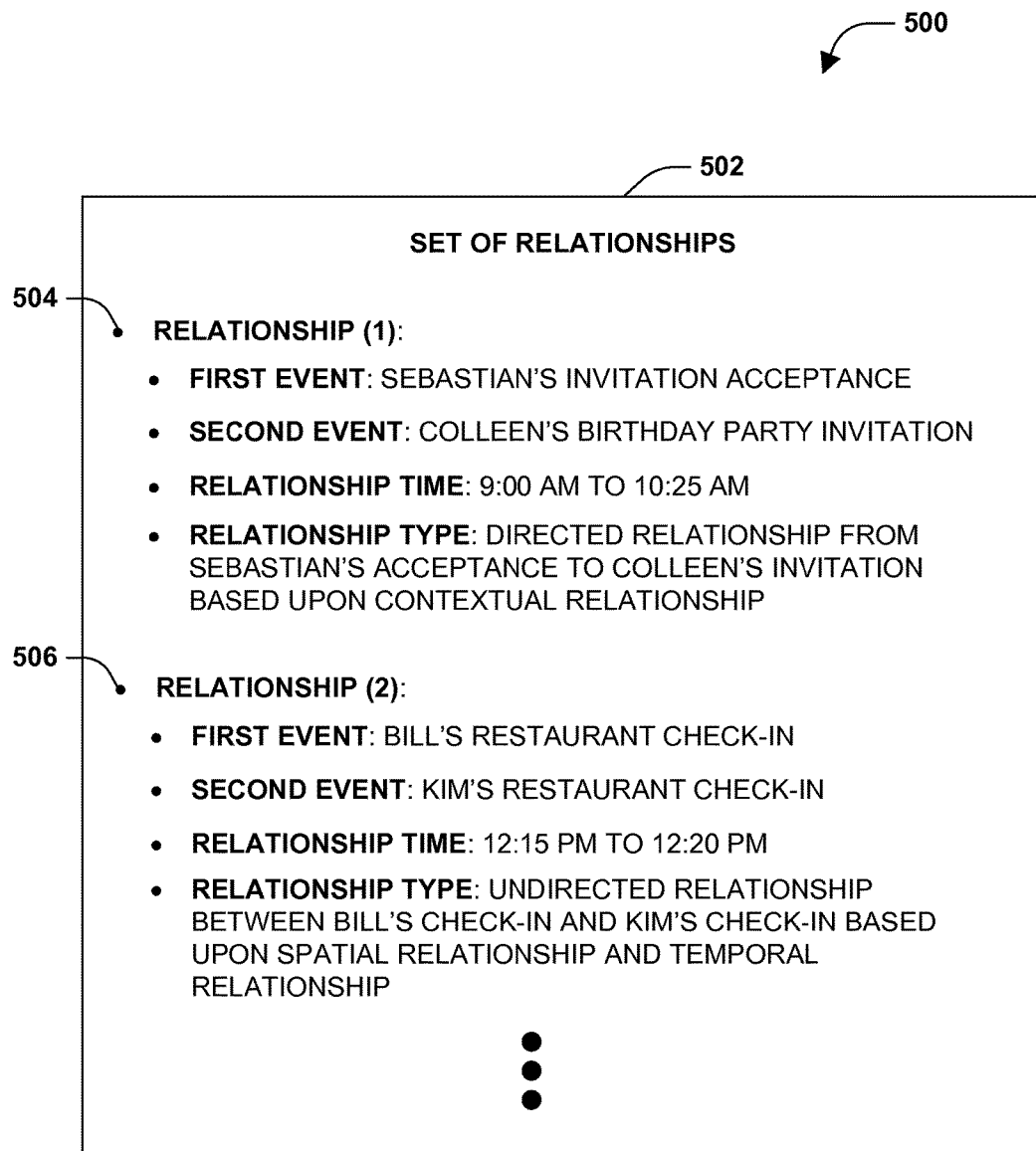
FIG. 5 is an illustration of an example of a set of relationships.

FIG. 5 illustrates an example 500 of a set of relationships 502. The set of relationships 502 may comprise a relationship (1) 504, a relationship (2) 506, and/or other non-illustrated relationships associated with a set of events (e.g., set of events 402 of FIG. 4). In one example, relationship (1) 504 may correspond to a directed relationship from a first event, Sebastian's invitation acceptance event, to a second event, Colleen's birthday party invitation event. Relationship (1) 504 may be directed because the first event occurred because of the second event (e.g., Sebastian's invitation acceptance event occurred in response to Colleen's birthday party invitation event). Relationship (1) 504 may be based upon a contextual relationship between the first event and second event because both events relate to Colleen's birthday party. Relationship (1) 504 may comprise a relationship time of 9:00 am (e.g., when Colleen's birthday party invitation was sent) to 10:25 am (e.g., when Sebastian's invitation acceptance was sent). In this way, relationship (1) 504 may comprise the first event, the second event, the relationship time, and/or the relationship type.

Relationship (2) 506 may correspond to an undirected relationship between a first event, Bill's restaurant check-in event, and a second event, Kim's restaurant check-in event. Relationship (2) 506 may be undirected because respective events may not have caused the occurrence of the other event. Relationship (2) 506 may be based upon a spatial relationship and/or a temporal relationship between the first event and the second event because both events may have occurred at a similar location (e.g., a restaurant) and/or at a similar time (e.g., 12:15 pm and 12:20 pm). In this way, relationship (2) 506 may comprise the first event, the second event, the relationship time, and/or the relationship type.

Figure 6:
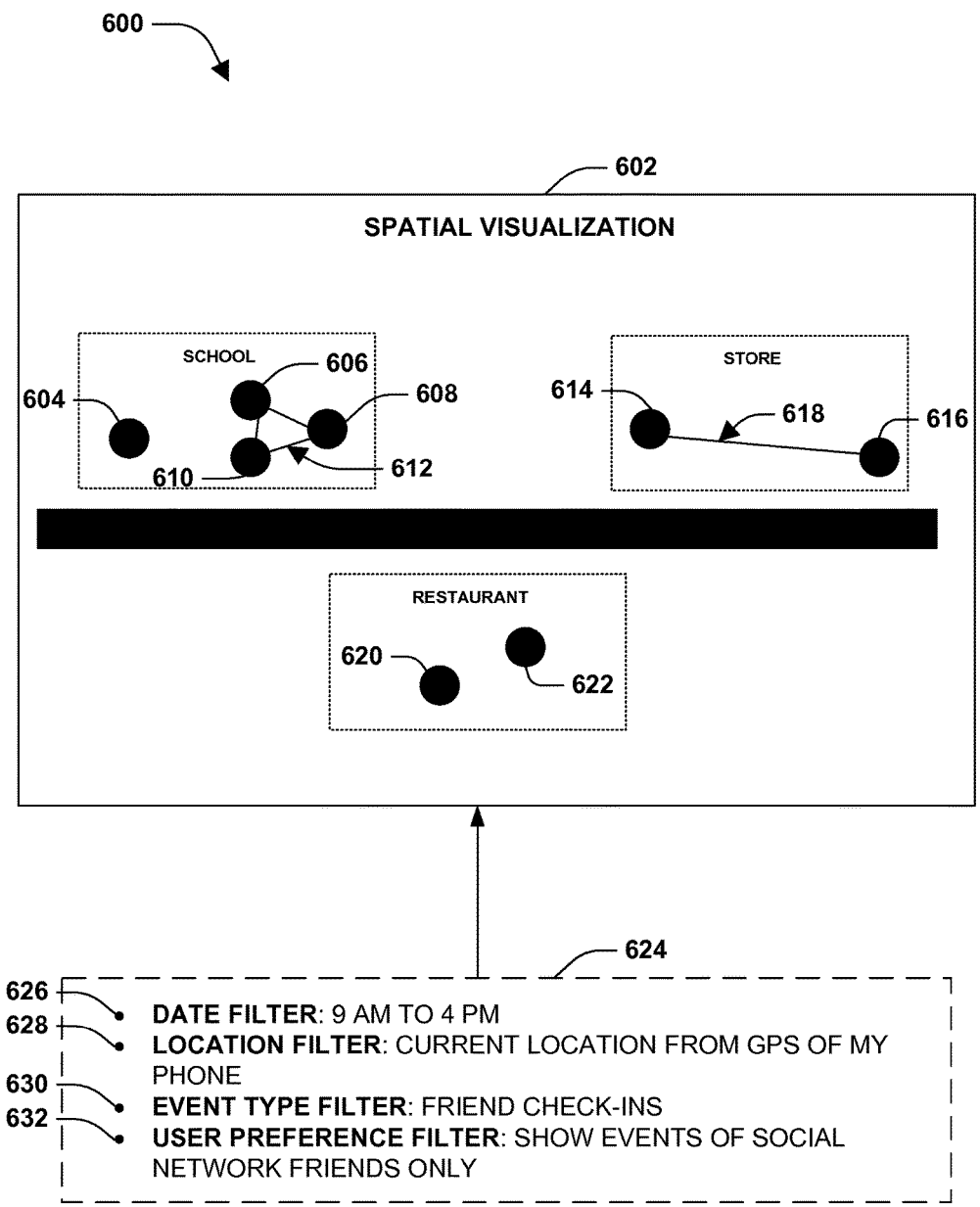
FIG. 6 is an illustration of an example of a spatial visualization populated with events and/or undirected relationships.

FIG. 6 illustrates an example 600 of a spatial visualization 602 populated with events and/or undirected relationships. The spatial visualization 602 may comprise a neighborhood map populated based upon filter criteria 624. The filter criteria 624 may comprise a date filter 626 of 9:00 am to 4:00 pm, a location filter 628 of a current location from a GPS of a user's cell phone (e.g., based upon consent provided by a user of the cell phone), an event type filter 630 of friend check-in events, and/or a user preference filter 632 of friend events within a social network. Accordingly, the spatial visualization 602 may be populated with friend check-in events from the social network, which occurred near a current location of the user from 9:00 am until 4:00 pm.

In one example of populating the spatial visualization 602, friend check-in events may be illustrated as black circle symbols within the neighborhood map near locations at which such friend check-in events occurred. For example, a first friend check-in event 604, a second friend check-in event 606, a third friend check-in event 608, and/or a fourth friend check-in event 610 may be illustrated near a school location within the neighborhood map (e.g., four friends may have checked in near the school between 9:00 am and 4:00 pm). Undirected relationships 612 between the second friend check-in event 606, the third friend check-in event 608, and/or the fourth friend check-in event 610 may be illustrated based upon a temporal relationship and/or a spatial relationship (e.g., three friends may have checked in from the same classroom and/or at substantially the same time (e.g., during the same class period), whereas the first friend check-in event 604 may have occurred at a somewhat different location and/or time). The relationship may also represent other undirected properties such as students that are friends, visit the same class, are of the same age and/or gender etc. (e.g., not merely local and/or temporal in nature, etc.).

A fifth friend check-in event 614 and/or a sixth friend check-in event 616 may be illustrated near a store location within the neighborhood map (e.g., two friends may have checked in near the store between 9:00 am and 4:00 pm). An undirected relationship 618 may be illustrated between the fifth friend check-in event 614 and the sixth friend check-in event 616 based upon a temporal relationship, a spatial relationship, and/or a referential relationship (e.g., two friends may have checked in at the store at a similar time, while at least one of the friends may have specified/referenced that they were with the other friend at the store). A seventh friend check-in event 620 and an eighth friend check-in event 622 may be illustrated near a restaurant location within the neighborhood map. However, no relationship may be created between the seventh and eighth friend check-in events because no relationship may exist (e.g., one friend may have checked in at 10:00 am at the restaurant, while the other friend may have checked in at 1:00 pm at the restaurant). In this way, the spatial visualization 602 may be populated with events and/or undirected relationships based upon the filter criteria 624.

Figure 7:
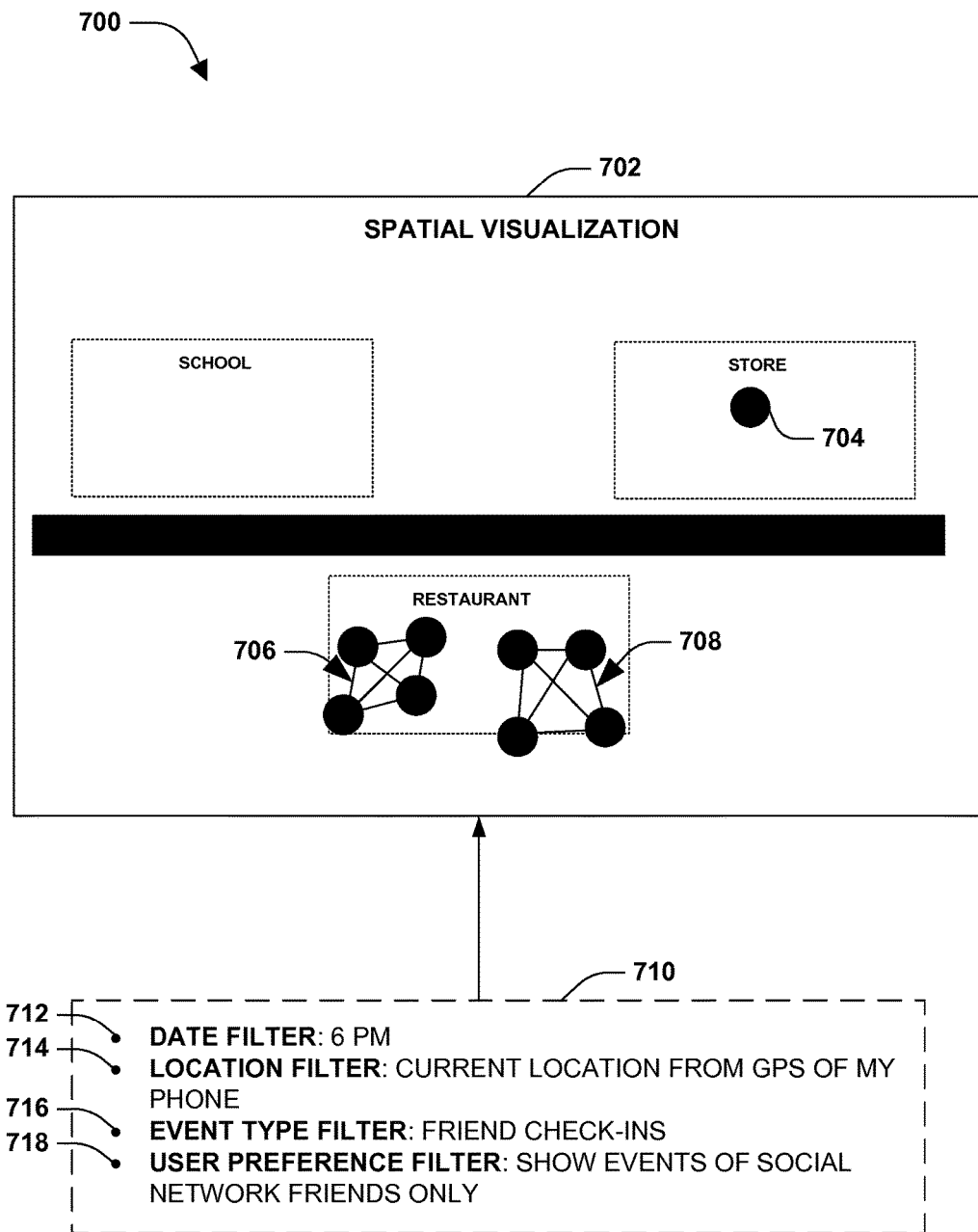
FIG. 7 is an illustration of an example of repopulating a spatial visualization with events and/or undirected relationships.

FIG. 7 illustrates an example 700 of repopulating a spatial visualization 702 with events and/or undirected relationships. The spatial visualization 702 may comprise a neighborhood map repopulated based upon filter criteria 710 (e.g., spatial visualization 602 of FIG. 6 may be repopulated/updated based upon user input through a time slider to specify a new date/time filter of 6:00 pm). The filter criteria 710 may comprise a date filter 712 of 6:00 pm, a location filter 714 of a current location from a GPS of a user's cell phone (e.g., based upon consent provided by a user of the cell phone), an event type filter 716 of friend check-in events, and/or a user preference filter 718 of friend events within a social network. Accordingly, the spatial visualization 702 may be repopulated with friend check-in events from the social network occurring near a current location of the user around 6:00 pm.

In one example of repopulating the spatial visualization 702, friend check-in events may be illustrated as black circle symbols within the neighborhood map near locations at which such friend check-in events occurred. For example, a first friend check-in event 704 may be illustrated near a store (e.g., a friend may have checked in near the store around 6:00 pm). A first set of friend check-in events 706 may be illustrated near a restaurant (e.g., four friends may have checked in near the restaurant around 6:00 pm). Undirected relationships may be illustrated between the first set of friend check-in events 706 based upon a contextual relationship (e.g., the friend check-in events may all be dinner check-in event types) and/or a referential relationship (e.g., the four friends may have specified/referenced that they were checking in together for dinner at the restaurant).

A second set of friend check-in events 708 may be illustrated near the restaurant (e.g., four other friends may have checked in near the restaurant around 6:00 pm). Undirected relationships may be illustrated between the second set of friend check-in events 708 based upon a contextual relationship (e.g., the friend check-in events may all be dinner check-in event types) and/or a referential relationship (e.g., the four other friends may have specified/referenced that they were checking in together for dinner at the restaurant). In this way, the spatial visualization 702 may be repopulated with events and/or undirected relationships based upon the filter criteria 710 (e.g., at a later point in time fewer events are occurring near the school and more events are occurring near the restaurant).

Figure 8:
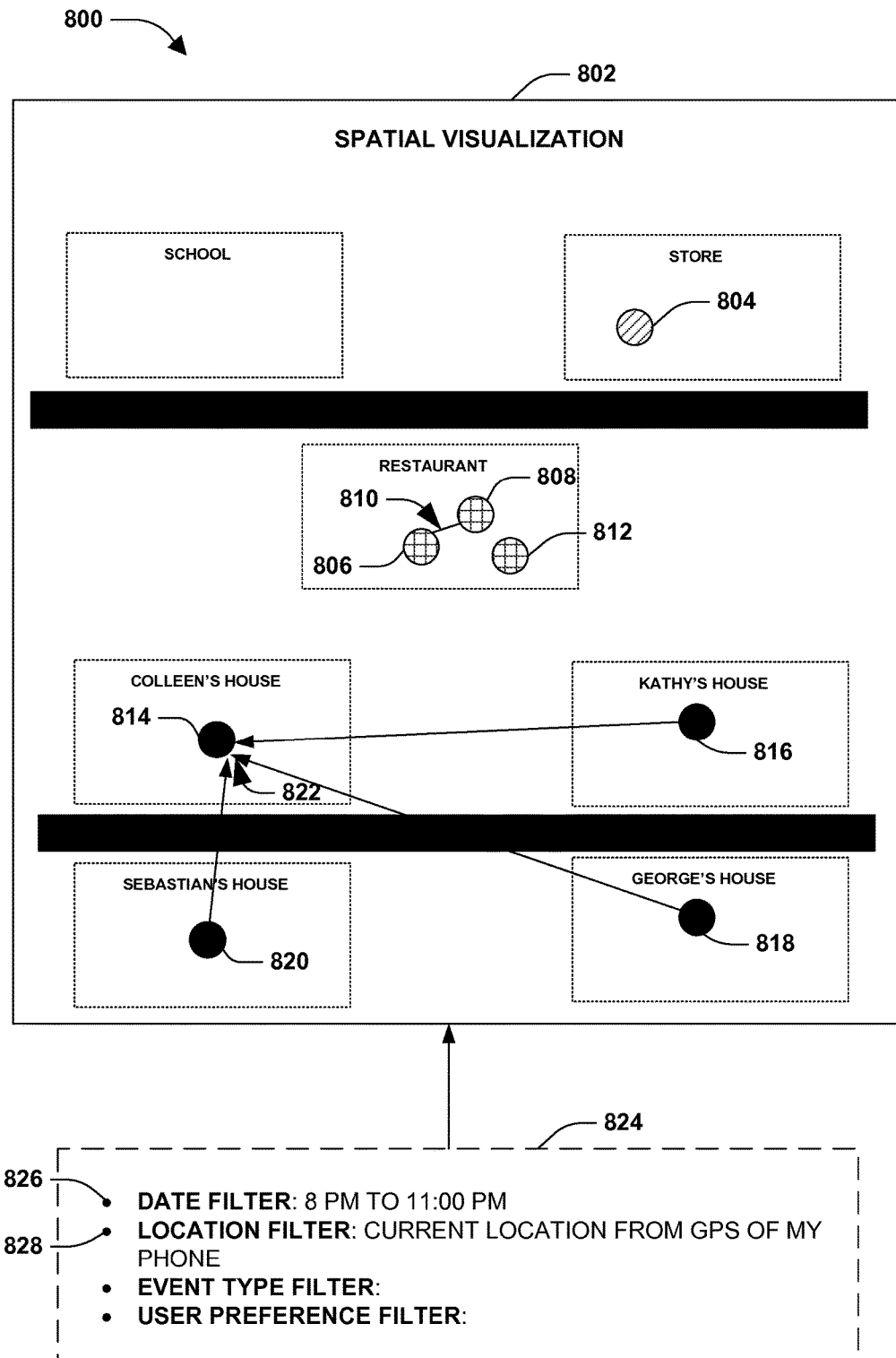
FIG. 8 is an illustration of an example of a spatial visualization populated with events, undirected relationships, and/or directed relationships

FIG. 8 illustrates an example 800 of a spatial visualization 802 populated with events, undirected relationships, and/or directed relationships. The spatial visualization 802 may comprise a neighborhood map populated based upon filter criteria 824. The filter criteria 824 may comprise a date filter 826 of 8:00 pm to 11:00 pm and/or a location filter 828 of a current location from a GPS of a user's cell phone (e.g., based upon consent provided by a user of the cell phone). Accordingly, the spatial visualization 802 may be populated with events (e.g., dinner check-in events, shopping check-in events, birthday invitation events, birthday invitation acceptance events, and/or other events not illustrated) occurring near a current location of the user from 8:00 pm until 11:00 pm.

In one example of populating the spatial visualization 802, shopping check-in events may be illustrated as transparent circle symbols with slanted or hashed lines, dinner check-in events may be illustrated as transparent circle symbols with checkered lines, and birthday party events (e.g., birthday invitation events and/or birthday invitation acceptance events) may be illustrated as black circle symbols within the neighborhood map. Undirected relationships may be illustrated as edges between two circle symbols and directed relationships may be illustrated as arrowed edges from a first circle symbol to a second circle symbol within the neighborhood map.

In one example, a shopping check-in event 804 may be illustrated near a store (e.g., a friend may have checked in near the store between 8:00 pm and 11:00 pm). A first dinner check-in event 806, a second dinner check-in event 808, and a third dinner check-in event 812 may be illustrated near a restaurant. An undirected relationship 810 between the first dinner check-in event 806 and the second dinner check-in event 808 may be illustrated based upon a temporal relationship (e.g., two friends may have checked in from the restaurant around similar times). However, no relationship may be determined for the third dinner check-in event 812 (e.g., which may have occurred more than an hour after the first and second dinner check-in events).

A birthday invitation event 814 may be illustrated near Colleen's house within the neighborhood map (e.g., Colleen may have sent a birthday party invitation message from her house between 8:00 pm and 11:00 pm). A first birthday invitation acceptance event 816 may be illustrated near Kathy's house (e.g., Kathy may have sent a birthday party acceptance message from her house between 8:00 pm and 11:00 pm). A second birthday invitation acceptance event 818 may be illustrated near George's house (e.g., George may have sent a birthday party acceptance message from his house between 8:00 pm and 11:00 pm). A third birthday invitation acceptance event 820 may be illustrated near Sebastian's house (e.g., Sebastian may have sent a birthday party acceptance message from his house between 8:00 pm and 11:00 pm). A set of directed relationships 822 (e.g., a first directed relationship from the first birthday invitation acceptance event 816 to the birthday invitation event 814, a second directed relationship from the second birthday invitation acceptance event 818 to the birthday invitation event 814, a third directed relationship from the third birthday invitation acceptance event 820 to the birthday invitation event 814) may be illustrated from the birthday invitation acceptance events to the birthday invitation event 814 because the birthday invitation acceptance events occurred in response to the birthday invitation event 814. In this way, the spatial visualization 802 may be populated with various types of events, directed relationships, and/or undirected relationships based upon the filter criteria 824.

Figure 9:
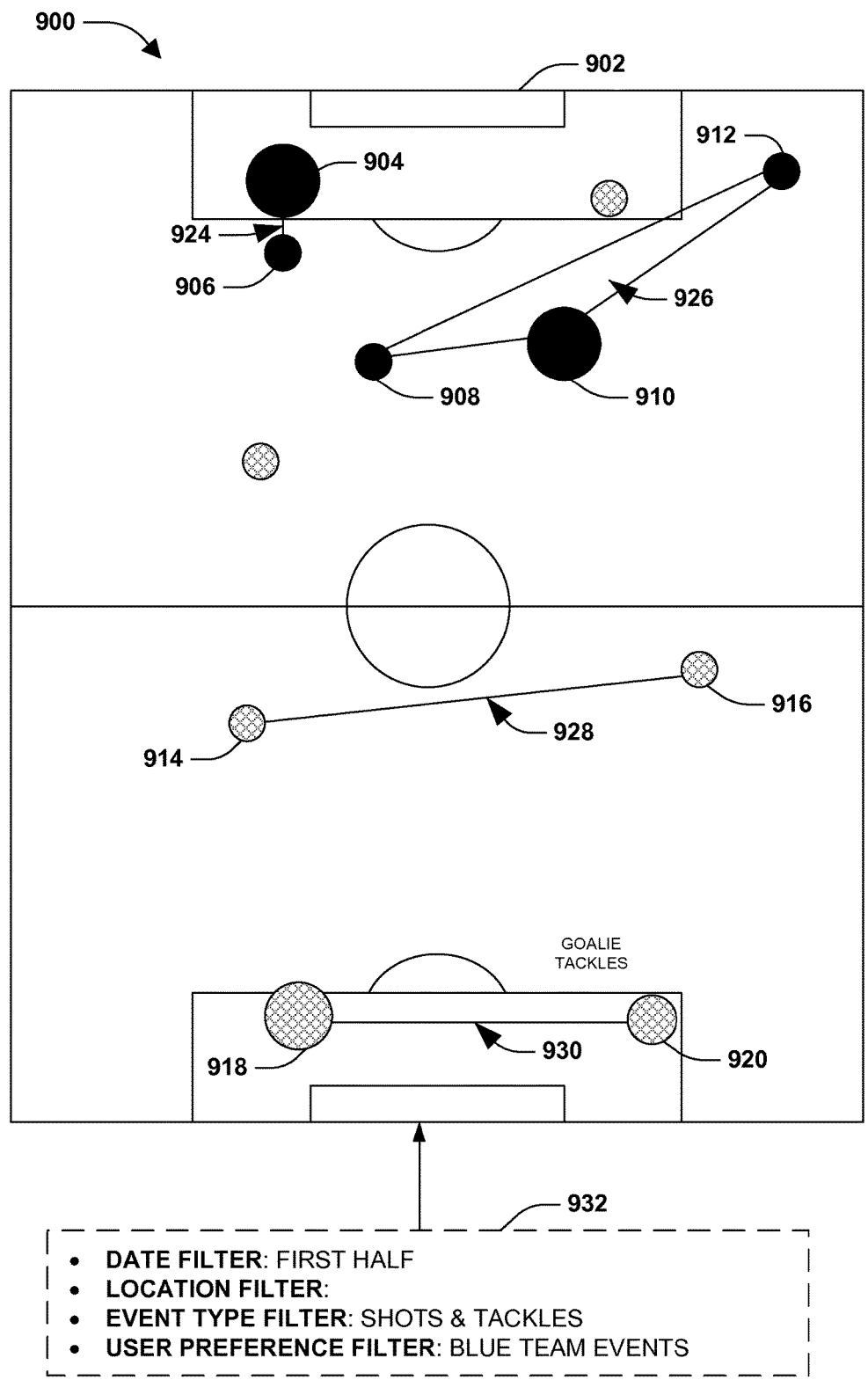
FIG. 9 is an illustration of an example of a spatial visualization populated with events and/or undirected relationships.

FIG. 9 illustrates an example 900 of a spatial visualization 902 populated with events and/or undirected relationships. The spatial visualization 902 may comprise a soccer field map populated based upon filter criteria 932. The filter criteria 932 may comprise a date filter (e.g., a time filter) of a first half of a soccer game, an event type filter of shot events and tackle events, and/or a user preference filter of blue team events. Accordingly, the spatial visualization 902 may be populated with shot events and/or tackle events of the blue team occurring during the first half of the soccer game.

In one example of populating the spatial visualization 902, shot events may be illustrated as black circle symbols within the soccer field map near locations at which such shot events occurred. For example, a first shot event 904 and a second shot event 906 may be illustrated near a red team's soccer goal. The first shot event 904 may be illustrated with a larger black circle symbol than the second shot event 906 because the first shot event 904 may have been a faster, more difficult, etc. shot (e.g., indicated by a relatively high importance ranking), while the second shot event 906 may have been a slower, less difficult, etc. shot (e.g., indicated by a relatively low importance ranking). An undirected relationship 924 between the first shot event 904 and the second shot event 906 may be illustrated because such shots may have both been made by the same player Emily. A third shot event 908, a fourth shot event 910, and/or a fifth shot event 912 may be illustrated within the soccer field map. The fourth shot event 910 may be illustrated with a larger black circle symbol than the third shot event 908 and/or the fifth shot event 912 because the fourth shot event 910 may have been a faster, more difficult, etc. shot (e.g., indicated by a relatively high importance ranking), while the third shot event 908 and/or the fifth shot event 912 may have been slower, less difficult, etc. shots (e.g., indicated by a relatively low importance ranking). A set of undirected relationships 926 may be illustrated between the third, fourth, and fifth shot events because such shots may have all been made by the same player Bill.

Tackle events may be illustrated as transparent circle symbols with checkered lines within the soccer field map near locations at which such tackle events occurred. For example, a first tackle event 914 and a second tackle event 916 may be illustrated within the soccer field map. An undirected relationship 928 may be illustrated between the first tackle event 914 and the second tackle event 916 because such tackles may have been made by the same player Emily. A third tackle event 918 and a fourth tackle event 920 may be illustrated near the blue team's soccer goal. An undirected relationship 930 may be illustrated between the third tackle event 918 and the fourth tackle event 920 because such tackles may have all been made by goalie Ray. The third tackle event 918 may be illustrated with a larger circle symbol than the fourth tackle event 920 because the third tackle event 918 may have resulted in a longer interruption in play, for example (e.g., indicated by a relatively high importance ranking). In this way, the spatial visualization 902 may be populated with various types of events and/or undirected relationships based upon the filter criteria 932.

Figure 10:
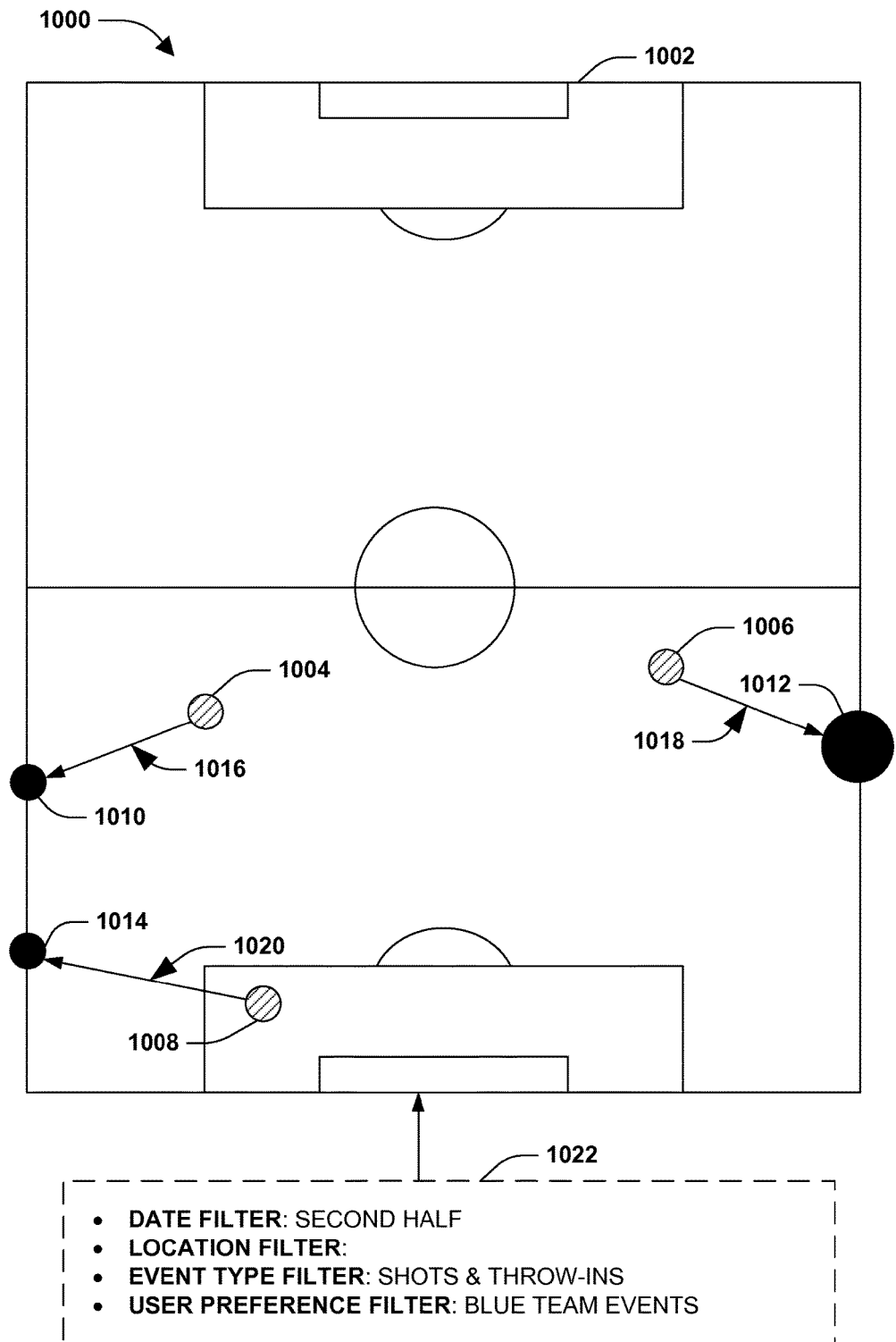
FIG. 10 is an illustration of an example of a spatial visualization populated with events and/or directed relationships.

FIG. 10 illustrates an example 1000 of a spatial visualization 1002 populated with events and/or directed relationships. The spatial visualization 1002 may comprise a soccer field map populated based upon filter criteria 1022. The filter criteria 1022 may comprise a date filter (e.g., a time filter) of a second half of a soccer game, an event type filter of shot events and throw-in events, and/or a user preference filter of blue team events. Accordingly, the spatial visualization 1002 may be populated with shot events and/or throw-in events of the blue team occurring during the second half of the soccer game.

In one example of populating the spatial visualization 1002, shot events may be illustrated as transparent circle symbols with checkered lines within the soccer field map near locations at which such shot events occurred. For example, a first shot event 1004, a second shot event 1006, and/or a third shot event 1008 may be illustrated within the soccer field map. Throw-in events may be illustrated as black circle symbols within the soccer field map near locations at which such throw-in events occurred. For example, a first throw-in event 1010, a second throw-in event 1012, and/or a third throw-in event 1014 may be illustrated within the soccer field map. Directed relationships may be illustrated as arrowed edges between events. For example, a first directed relationship 1016 may be illustrated as an arrowed edge from the first shot event 1004 to the first throw-in event 1010 because the first shot may have caused the first throw-in event to occur during the second half of the soccer game (e.g., the first shot may have caused the ball to go over the side line, thus resulting in the first throw-in). A second directed relationship 1018 may be illustrated as an arrowed edge from the second shot event 1006 to the second throw-in event 1012 because the second shot may have caused the second throw-in event to occur during the second half of the soccer game (e.g., the second shot may have caused the ball to go over the side line, thus resulting in the second throw-in). A third directed relationship 1020 may be illustrated as an arrowed edge from the third shot event 1008 to the third throw-in event 1014 because the third shot may have caused the third throw-in event to occur during the second half of the soccer game (e.g., the third shot may have caused the ball to go over the side line, thus resulting in the third throw-in). In this way, the spatial visualization 1002 may be populated with various types of events and/or directed relationships based upon the filter criteria 1022. The second throw-in event 1012 may be illustrated with a larger black circle symbol because the second throw-in event 1012 may have led to a scoring shot (e.g., indicated by a relatively high importance ranking).

Figure 11:
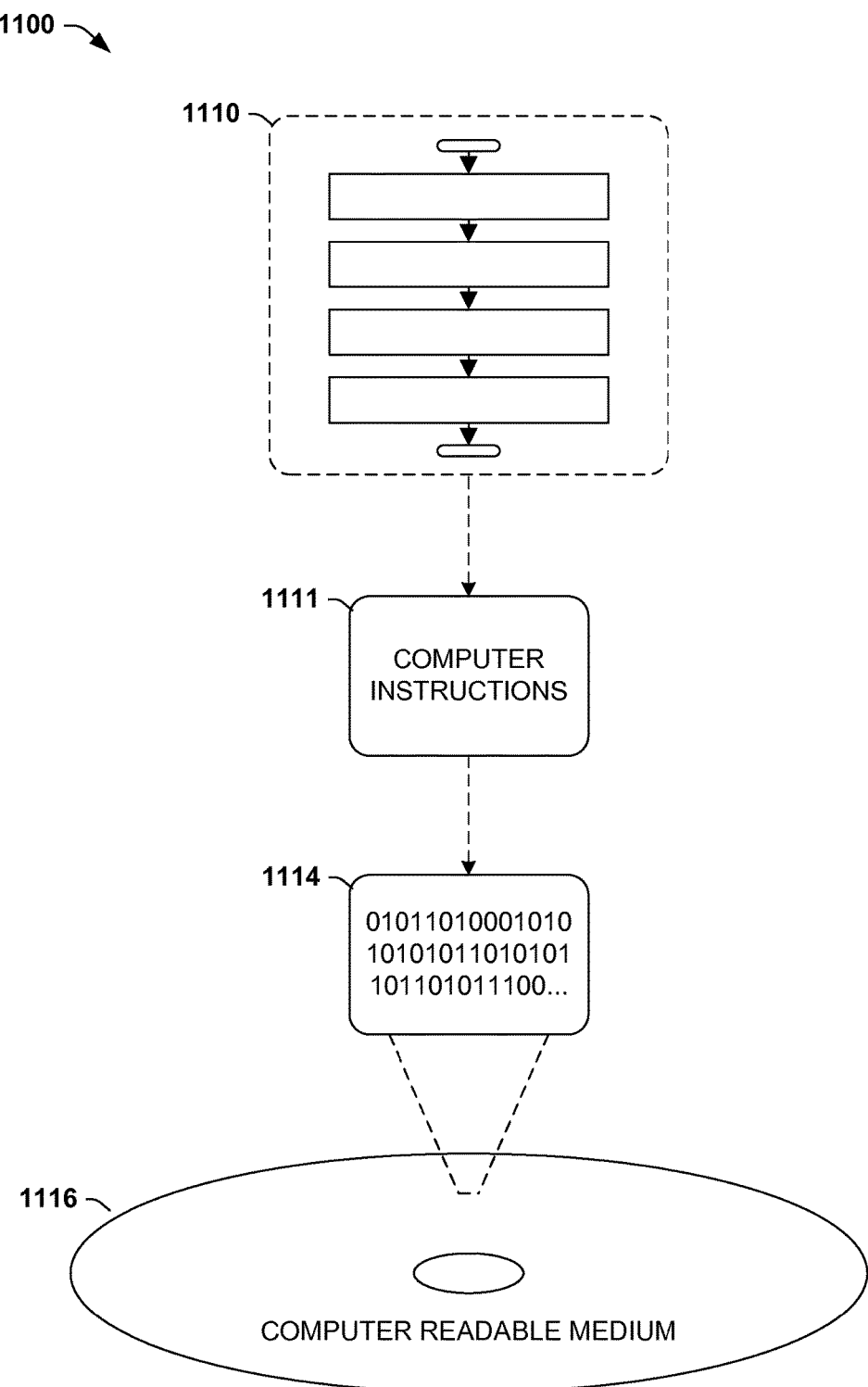
FIG. 11 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1116 (e.g., a CD-R, DVD-R, or a platter of a hard disk drive), on which is encoded computer-readable data 1114. This computer-readable data 1114 in turn comprises a set of computer instructions 1112 configured to operate according to one or more of the principles set forth herein. In one such embodiment 1100, the processor-executable computer instructions 1112 may be configured to perform a method 1110, such as at least some of the exemplary method 100 of FIG. 1 and/or at least some of exemplary method 200 of FIG. 2, for example. In another such embodiment, the processor-executable instructions 1112 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
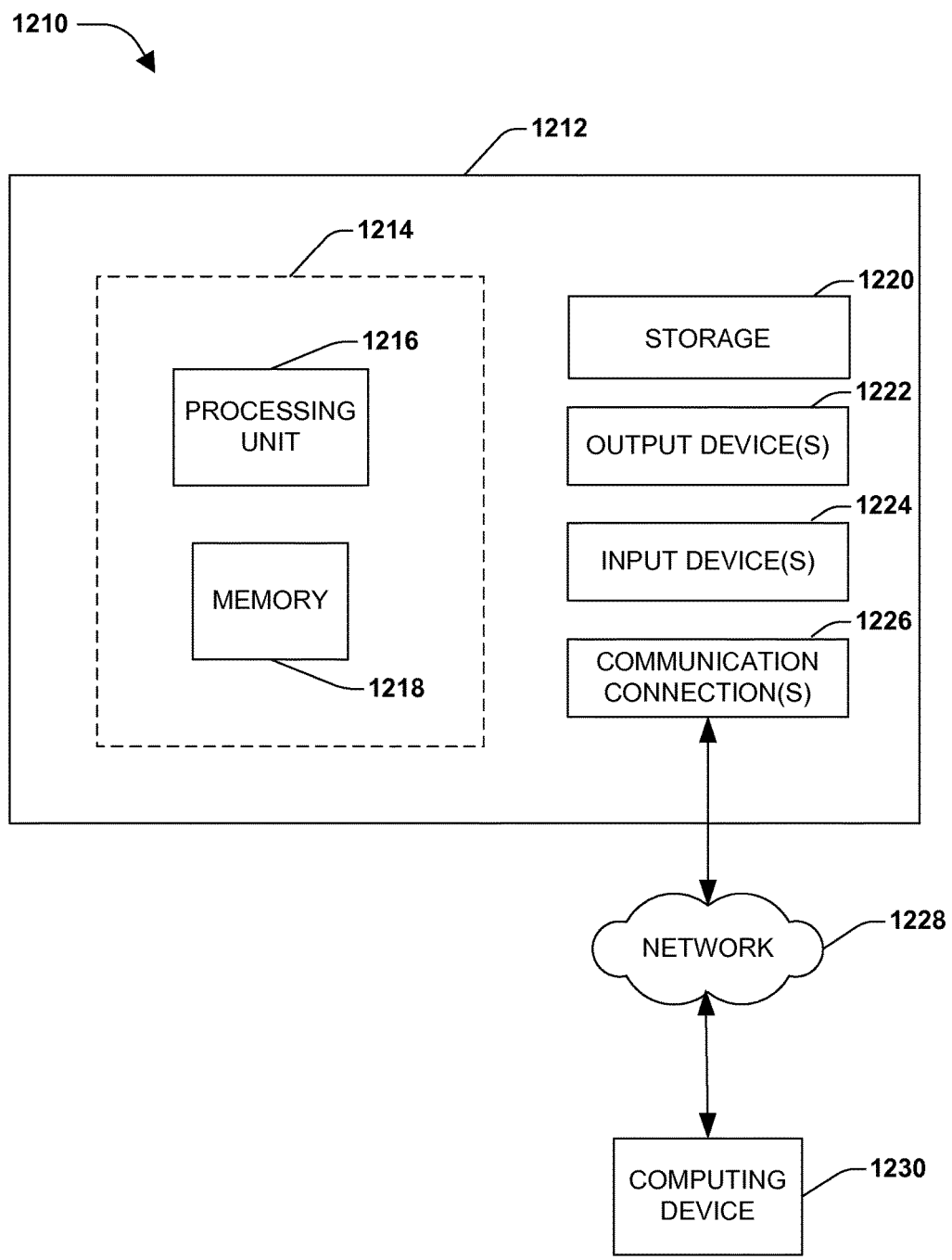
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via a network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for populating a spatial visualization, comprising:
   receiving filter criteria comprising at least one of a date filter, a location filter, an event type filter, a relationship type filter, or a user preference filter;
   extracting a filtered set of events from a data source based upon the filter criteria;
   creating a temporal relationship between at least two events in the set of events, the temporal relationship based on the filter criteria;
   creating a spatial relationship between at the least two events in the set of events, the spatial relationship based on the filter criteria;
   populating a spatial visualization using the at least two events to create a populated spatial visualization, wherein the populated spatial visualization includes a visualization of the at least two events, the temporal relationship between the at least two events, and the spatial relationship between the at least two events; and
   creating at least one of:
      a referential relationship between a first event and a second event, the referential relationship identified based upon data associated with the first event comprising a reference to data associated with the second event; or
      a contextual relationship between the first event and the second event, the contextual relationship identified based upon a first event type of the first event corresponding to a second event type of the second event.

2. The method of claim 1, wherein each event of the set of extracted events includes a location, an event time, and an event type.

3. The method of claim 1, the extracting comprising:
   assigning a first event type to a first event of the set of events based upon at least one of:
      evaluating an event type field defined by the data source to identify the first event type; or
      executing a classification technique upon data from the data source associated with the first event to identify the first event type.

4. The method of claim 1, further comprising:
   defining a first relationship type for the relationship between the first event and the second event based upon a first event type of the first event and a second event type of the second event.

5. The method of claim 1, further comprising:
   defining a first relationship time for the relationship between the first event and the second event based upon a first event time of the first event and a second event time of the second event.

6. The method of claim 1, wherein the at least two events include a first event and second event, and the first event is in a:
   a directed relationship with the second event.

7. The method of claim 1, the populating comprising:
   representing one of the at least two events using a first symbol; and
   representing another of the at least two events using a second symbol different than the first symbol.

8. The method of claim 7,
   wherein the first symbol is sized according to an importance ranking.

9. The method of claim 1, comprising animating the populated spatial visualization.

10. The method of claim 1, wherein the first event type and the first event type is selected from the group consisting of: historical events, news stories, sports events, personal events, and real-time events temporal type.

11. A system comprising a processor in electronic communication with a computer readable storage media, the computer readable storage media storing instructions that, when executed, perform a method, the method comprising:
    receiving filter criteria comprising at least one of a date filter, a location filter, an event type filter, a relationship type filter, or a user preference filter;
    extracting a filtered set of events from a data source based upon the filter criteria;
    creating a temporal relationship between at least two events in the set of events, the temporal relationship based on the filter criteria;
    creating a spatial relationship between at the least two events in the set of events, the spatial relationship based on the filter criteria;
    populating a spatial visualization using the at least two events to create a populated spatial visualization, wherein the populated spatial visualization includes a visualization of the at least two events, the temporal relationship between the at least two events, and the spatial relationship between the at least two events
    creating at least one of:
       a referential relationship between a first event and a second event, the referential relationship identified based upon data associated with the first event comprising a reference to data associated with the second event; or
       a contextual relationship between the first event and the second event, the contextual relationship identified based upon a first event type of the first event corresponding to a second event type of the second event.

12. The system of claim 11, wherein each event of the set of extracted events includes a location, an event time, and an event type.

13. The system of claim 11, the extracting comprising:
assigning a first event type to a first event of the set of events based upon at least one of:
evaluating an event type field defined by the data source to identify the first event type; or
executing a classification technique upon data from the data source associated with the first event to identify the first event type.

14. The system of claim 11, further comprising:
defining a first relationship type for the relationship between the first event and the second event based upon a first event type of the first event and a second event type of the second event.

15. The system of claim 11, further comprising:
defining a first relationship time for the relationship between the first event and the second event based upon a first event time of the first event and a second event time of the second event.

16. The system of claim 11, wherein the at least two events include a first event and second event, and the first event is in a directed relationship with the second event.

17. The system of claim 11, the populating comprising:
representing one of the at least two events using a first symbol; and
representing another of the at least two events using a second symbol different than the first symbol.

18. A computer readable storage device storing instructions that, when executed perform a method, the method comprising:
receiving filter criteria comprising at least one of a date filter, a location filter, an event type filter, a relationship type filter, or a user preference filter;
extracting a filtered set of events from a data source based upon the filter criteria;
creating a temporal relationship between at least two events in the set of events, the temporal relationship based on the filter criteria;
creating a spatial relationship between at the least two events in the set of events, the spatial relationship based on the filter criteria;
populating a spatial visualization using the at least two events to create a populated spatial visualization, wherein the populated spatial visualization includes a visualization of the at least two events, the temporal relationship between the at least two events, and the spatial relationship between the at least two events; and
creating at least one of:
a referential relationship between a first event and a second event, the referential relationship identified based upon data associated with the first event comprising a reference to data associated with the second event; or
a contextual relationship between the first event and the second event, the contextual relationship identified based upon a first event type of the first event corresponding to a second event type of the second event.

19. The computer readable storage device of claim 18, wherein each event of the set of extracted events includes a location, an event time, and an event type.

20. The computer readable storage device of claim 18, the extracting comprising: assigning a first event type to a first event of the set of events based upon at least one of: evaluating an event type field defined by the data source to identify the first event type; or executing a classification technique upon data from the data source associated with the first event to identify the first event type.

* * * * *